N. G. Norcross,
Circular Saw Mill.
No. 1,002. Reissued July 10, 1860.
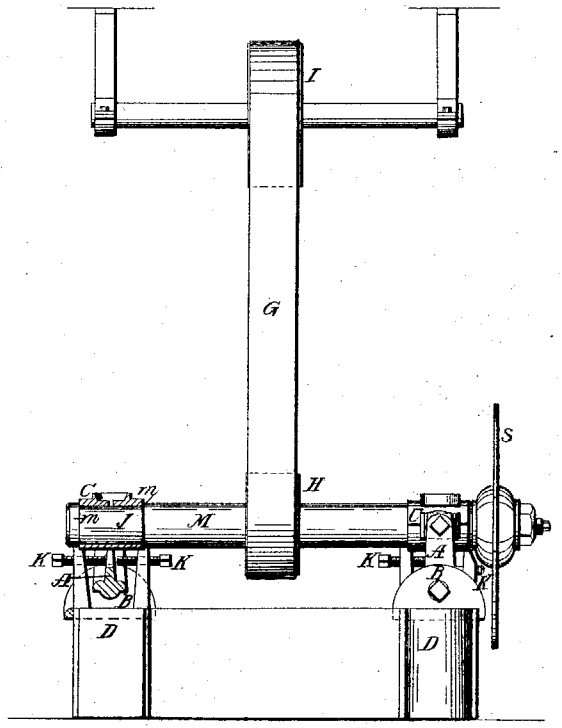
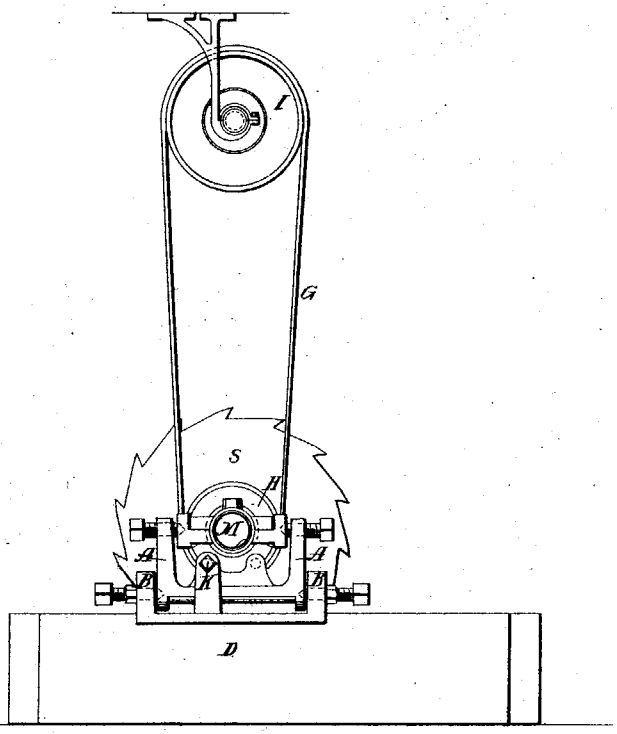
Witnesses:
Wm Luke Ashley
Charles L. Hughes
Inventor:
N. G. Norcross
Knight Brothers Attorneys
AM. PHOTO-LITHO. CO. N.Y. (OSBORNE'S PROCESS)

UNITED STATES PATENT OFFICE.

NICHOLAS G. NORCROSS, OF LOWELL, MASSACHUSETTS.

IMPROVEMENT IN CIRCULAR-SAW MILLS.

Specification forming part of Letters Patent No. 7,027, dated January 15, 1850; Reissue No. 1,002, dated July 10, 1860.

*To all whom it may concern:*

Be it known that I, NICHOLAS G. NORCROSS, of Lowell, in the county of Middlesex and State of Massachusetts, have invented certain new and useful Improvements in Circular-Saw Mills; and I hereby declare the following to be a full, clear, and exact description of the nature, construction, and operation thereof, reference being had to the annexed drawings, making part of this specification.

My invention relates to the class of circular-saw mills which contain provision for a lateral yield or play of the saw when subjected to pressure by reason of the spring or other irregularities of the stuff; and it consists in, first, a mode of supporting the arbor of a circular saw so that it will yield to the slightest disturbing force in the direction of its axis, while at the same time the journals have no end-play in their boxes; second, the application to the central part of the saw of a reacting agent capable of restoring the saw promptly and accurately to line the instant that the disturbing cause is removed.

The rapid, continuous, and uniform action of circular saws, their sustained momentum, and their comparative compactness, portability, and ease of running had long caused a desire for their substitution for the more prevalent but bulky and expensive arrangements of reciprocating saws; but in applying them to heavy timber it was found that the springing, warping, and other irregularities of the stuff created severe lateral pressures, which acted to heat and "buckle" the saw, causing it either to be wholly inoperative or to cut rank and with a great waste of material and power. This defect was, in part, remedied by a provision for end-play of the mandrel in its boxes, restricted only by pressure-rollers near the front edge of the saw; but such an arrangement was of very limited application, because the rollers could not confine closely the outer edge of the saw without creating heat, and whatever freedom was allowed resulted in inaccuracy to the lumber—an evil that was increased by the considerable endlong friction of the journals, opposing a return of the saw to line. The combined endlong play and rapid rotation of the mandrel in its boxes and the absence of confining-collars also results in serious waste of oil.

The accompanying drawings represent a saw and its supporting and driving parts, illustrative of my invention, Figure 1 being an end elevation thereof; and Fig. 2, a side elevation, partly in section.

S represents a circular saw attached in the customary manner to an arbor or mandrel, M.

The journals J of the arbor M are confined snugly within their boxes C by means of collars or shoulders *m* on the arbor. The boxes C are jointed to and supported upon swing standards or frames A, which are themselves hinged or joined to boxes, B, attached to a portion, D, of the main frame, so as to hold the arbor to a horizontal position while permitting sufficient lateral play, the motion being in a curved line, and of course inclining downward as the standards A recede either way from a vertical position, the hinged or jointed connections of the various bearings at the same time preventing the binding of the journals.

In order to apply to the arbor a reacting agent, the driving-belt G passes around a pulley, H, on the arbor and up over a driving-pulley, I, above, so that when the belt is tightened it holds the swing-frame A in the direction of the shortest line, or directly upright. It is manifest that when the arbor is deflected either way the belt becomes slightly elongated or stretched, and its tendency, as soon as the disturbing cause is removed, is to contract to its original length and position, and thus restore the mandrel to place and the saw to line. By these arrangements it will be seen that while the slightest force will cause the saw to deviate a little laterally, the constant tendency of the reacting agent is to bring it back to place again. By these means I am enabled to use a much thinner saw and to save material and power to a great degree. These objects are here accomplished by means which are believed to constitute the first successful application of a reacting force to a circular saw, independently of the spring of the blade itself.

Adjustable guides or stops K may be applied to boxes, E the standards A, or elsewhere, so as to limit the lateral play or to confine it to either direction.

The jointed connections of the bearings may consist either of gudgeons, or centers, or pivots passing through the frames.

The form selected to illustrate my invention is that which actual and extensive test has proved effective, and the one which appears to contain the fewest possible parts, the driving-belt in connection with my sensitive arrangment of yielding bearings being made to serve the double office of a driver and a spring or reacting agent, in preference to the more obvious application of a separate spring; but with saws where such use of the driving-belt is impracticable or inconvenient, any customary form of spring applied to the arbor would evidently have essentially the same operation and results.

It will also be seen that the fixture to which the swing-frame is hinged may be in any position in the plane of rotation of the saw, provided the driving-pulley is hung directly on the opposite side of the arbor—that is to say, having the points of support and suspension in a right line, so as to secure the described action of the belt.

By applying the reacting agent to the central part of the saw through the medium of the arbor, or in any manner substantially equivalent, the return of the saw to line is instantaneous and unfailing, while at the same time its periphery is entirely exempt from undue strain or friction.

I claim herein as new and of my invention and desire to secure by Letters Patent—

1. The application to circular-saw frames of rocker-boxes and a swing-frame, for the purpose of affording end-play to the arbor, as set forth.

2. The application of a reacting agent to the central part of a circular saw through the medium of the mandrel, or by any other substantially equivalent means, for the purpose of restoring the saw to line after it has been deflected.

3. Suspending a circular-saw frame in position and restoring it to line by means of the driving-belt, arranged and operating substantially as set forth.

In testimony of which invention I hereunto set my hand.

NICHOLAS G. NORCROSS.

Witnesses:
J. F. ROGERS,
S. W. STICKNEY.